United States Patent
Dodman et al.

(10) Patent No.: US 7,762,571 B2
(45) Date of Patent: Jul. 27, 2010

(54) SPLIT BOTTOM BRACKET

(75) Inventors: Christopher P. Dodman, Basel (CH); Curtis Wayne Detwiler, Altoona, PA (US)

(73) Assignee: Cannondale Bicycle Corporation, Bethel, CT (US)

( * ) Notice: Subject to any disclaimer, the term of this patent is extended or adjusted under 35 U.S.C. 154(b) by 525 days.

(21) Appl. No.: 11/735,212

(22) Filed: Apr. 13, 2007

(65) Prior Publication Data

US 2008/0253708 A1 Oct. 16, 2008

(51) Int. Cl.
*B62K 19/34* (2006.01)
*B62M 3/00* (2006.01)

(52) U.S. Cl. .................. 280/281.1; 280/274; 74/594.1

(58) Field of Classification Search ............... 280/274, 280/275, 281.1, 282, 283; 74/594.1, 594.2
See application file for complete search history.

(56) References Cited

U.S. PATENT DOCUMENTS

| | | | |
|---|---|---|---|
| 500,177 A * | 6/1893 | Winton ................... 280/281.1 |
| 513,260 A * | 1/1894 | Davis ......................... 280/275 |
| 547,990 A | 10/1895 | Grinden |
| 641,907 A | 1/1900 | Thompson |
| 648,657 A | 5/1900 | Dikeman |
| 658,400 A * | 9/1900 | Roberts ................... 280/281.1 |
| 670,957 A | 4/1901 | Johnson |
| 846,239 A | 3/1907 | Osborne |
| 1,205,382 A * | 11/1916 | Parda ........................ 280/261 |
| 2,979,366 A * | 4/1961 | Steller ....................... 384/458 |
| 3,030,124 A * | 4/1962 | Holloway ................ 280/281.1 |
| 4,252,384 A | 2/1981 | Duvoisin et al. ........... 308/23.5 |
| 4,704,919 A | 11/1987 | Durham ...................... 74/594.1 |
| 5,209,581 A | 5/1993 | Nagano ...................... 384/545 |
| 5,924,336 A | 7/1999 | Richardson ................ 74/594.1 |
| 6,360,855 B1 * | 3/2002 | Szu-Yin ...................... 188/161 |
| 6,435,726 B1 | 8/2002 | Chi ............................ 384/545 |
| 2004/0036251 A1 | 2/2004 | Baldwin |

FOREIGN PATENT DOCUMENTS

| | | |
|---|---|---|
| DD | 245 629 | 5/1987 |
| DE | 806 205 | 7/1951 |
| DE | 868702 C | 2/1953 |
| DE | 9404889 U1 | 5/1994 |
| DE | 10235582 A1 | 2/2004 |
| FR | 1491544 A | 8/1967 |
| GB | 2289874 A | 12/1995 |

OTHER PUBLICATIONS

Dr. Helmut Rattay, Werkkunde Fur Metallberufe, p. 3 and pp. 93-103, (15 pages).
European Search Report; Application No. 08251408.4; Mail date: Jul. 18, 2008.

* cited by examiner

*Primary Examiner*—Lesley Morris
*Assistant Examiner*—Marc A Scharich
(74) *Attorney, Agent, or Firm*—Cantor Colburn, LLP

(57) ABSTRACT

A bottom bracket assembly for use on a bicycle, the assembly provided as a split bracket assembly with an upper portion formed integrally with the bicycle frame and a lower portion detachably connectable to the upper portion, the lower portion completely removable from the upper portion. The bottom bracket assembly provided to capture a crank shaft therein with associated bearings to facilitate the rotation of the crank shaft assembly.

13 Claims, 6 Drawing Sheets

SPLIT BOTTOM BRACKET

FIELD OF THE INVENTION

The invention relates to a bottom bracket assembly used for supporting a crank assembly used on a bicycle, and more particularly, to a bottom bracket assembly that has a split housing allowing a lower half of the housing to be removed from the bicycle.

BACKGROUND OF THE INVENTION

Bicycles are typically provided with a crank shaft assembly that propels the bicycle when operated by a rider. Crank assemblies typically comprise a crank shaft that extends through a bottom bracket formed into the lower portion of a bicycle frame and pedal arms that are coupled to the crank shaft.

The limitation of known systems is that, while they may effectively be used with multi-piece crank shaft assemblies, they cannot effectively be used with standard-size single-piece crank shaft assemblies. For example, rather than have a crank shaft assembly comprise a crank shaft and two detachable pedal arms, it may be desired based upon the application to provide an integrated assembly. However, a single-piece structure would comprise a pedal arm extending in a first direction that transitions into the crank shaft extending at essentially a right angle from the pedal shaft, which then transitions into the other pedal arm that extends again at a right angle from the crank shaft and in an opposite direction from the first pedal arm. The result is that the unitary structure cannot readily be inserted through the relatively close fitting standard-size bottom bracket. This is not a problem for multi-piece crank shaft assemblies as the crank shaft may be inserted into the bottom bracket and then the pedal arms attached. While it is possible to manufacture an oversized bottom bracket assembly, this is undesirable as this greatly increases the weight of the assembly.

A number of systems have attempted to provide additional versatility for the bottom bracket assembly with limited success. For example, U.S. Pat. Nos. 4,252,384; 846,239; 648,657; and 641,907 all disclose a bottom bracket assembly that is variable in size. The bottom bracket assembly is provided with an opening in the housing and two tab portions extending on either side of the opening such that when the screw or bolt is tightened, it draws the opening closed. While this does provide some versatility for insertion and removal of the crank shaft assembly, a major drawback for these systems is fatigue of the bottom bracket assembly. This is especially problematic for frequent changing/adjustment of the crank shaft assembly. The problem is fundamental to the design because the bottom bracket assembly necessarily must flex open and close when changing or adjusting the crank shaft assembly leading to relatively early failure of the bottom bracket. Additionally, there is also a constant residual stress induced in the bottom bracket, reducing the ability of the assembly to withstand extreme outside forces. In other words, the entire assembly becomes substantially weaker if the part is pre-stressed.

Another system that has attempted to provide additional versatility is U.S. Pat. No. 547,990 entitled "Frame Connection For Bicycles." This system employs a two-piece removable assembly that couples to the three bicycle supporting tubes that converge at the bottom bracket. As can be seen in the figures, the top piece fits in and around all three of the tubes, while the bottom piece fits part way around two of the tubes and attaches to the top piece. While this assembly provides additional versatility, the strength of the device is seriously compromised, which is especially critical in high impact applications, such as mountain biking and off-road applications. The reference teaches that a brazing technique may be used, however, this requires increased labor and cost and still does not provide adequate strength. Another problem with this arrangement is that if the tubes are provided as a composite material, the brazing technique cannot be used. This would result in a bicycle that is only held together by a couple of screws.

Still another system is disclosed in U.S. Pat. No. 5,209,581, which is directed to a crank arm mounting apparatus for a bicycle. This reference states that when the crank arms are "integrated with the crank shaft, a split bottom bracket is used which is hinged at one side thereof" and that after "placing the crank shaft unit in this bracket, the other free sides of the brackets are rigidly interconnected by bolts or the like." (Col. 4, In. 67-Col. 5, In. 4.) While this system does provide for increased versatility, this system does not provide adequate adjustment and sealing of the bottom bracket assembly. For example, the reference teaches that the bottom bracket may be loosened on one side and opened when the opposite side is attached via a hinge arrangement. The system necessarily will be looser or open on the hinge side to allow the bottom portion to effectively rotate open and closed. This system only allows for tightening of one side of the bottom bracket therefore, when the hinged side loosens over time, there is no way to tighten it. For mountain biking and off-road applications, this will allow an unacceptable amount of dirt and/or debris into the bottom bracket resulting in damage and decreased performance. In addition, a hinge will, over time, be subject to corrosion, thereby making opening and closing difficult and negatively affecting the strength of the bracket assembly. Also, optimum bearing pre-load is difficult to obtain consistently, and so as to allow for free rotation of the bearings, the hinged side must be minimally tightened, thereby allowing the possibility of unexpected loosening of the bolts due to variable loading and vibration and also unexpected movement of the crank shaft assembly, which is highly undesirable.

SUMMARY OF THE INVENTION

Accordingly, what is desired then is a bottom bracket assembly that is usable with a single-piece crank shaft assembly.

It is also desired to provide a light weight bottom bracket assembly that provides increased versatility with respect to the crank shaft assembly without compromising the strength of the bottom bracket assembly.

It is further desired to provide a bottom bracket assembly that provides increased versatility with respect to the crank shaft assembly that allows for proper sealing and adjustment of the bottom bracket assembly as the system wears over time.

It is still further desired to provide an assembly that when assembled has upper and lower portions clamped tightly with bolts or the like, the tension in which is independent of the bearing preload. The bearing preload is obtained by simultaneously machining the bearing bores in the upper and lower portions while clamped tightly, thereby providing a consistent bearing preload each and every time the bottom bracket is assembled, regardless of the tension in the mounting bolts.

These objects are achieved at least in part by the provision of a split bottom bracket assembly that includes a top portion integrally formed as a part of the bicycle frame and a fully detachable lower portion. The upper and lower portions may be provided with complementary mounting elements. For example, both the upper and lower portions may be provided with complementary mounting tabs on opposing sides of the bracket assembly such that screws or bolts may be used to securely affix the lower portion to the upper portion. In this manner, the lower portion is completely removable from the top portion and adjustment of the lower portion may be performed on both sides of the lower bottom bracket to fully seal the assembly. Alternatively, the lower portion may be provided in multiple sections.

With this bottom bracket configuration, the lower portion may be completely removed allowing for cleaning and even machining of the lower portion. Proper tension can therefore be obtained in the mounting bolts, ensuring the assembly will not loosen while subjected to variable loads and vibration. In one advantageous embodiment, a seal may be provided for positioning between the upper and lower portions.

It should further be noted that, reference is made to a single lower portion, however, it may be advantageous to provide the lower portion in a number of removable sections. In addition, while reference is made to an "upper" and a "lower" portion(s), these terms are merely used to differentiate one piece or pieces from the other that make up the entire bottom bracket assembly and are not meant to otherwise limit the invention to a configuration where the only the "lower" portion is removable. For example, it is contemplated that that the "upper" and "lower" portions may be positioned one in front of the other, or the "lower" portion may be made integral with the frame while the "upper" portion is removable therefrom.

While the split bottom bracket assembly according to the present invention provides versatility for mounting a single-piece crank arm assembly to the bicycle, it is contemplated that the split bottom bracket assembly may also be used with conventional multi-piece crank assemblies.

In one advantageous embodiment, a bottom bracket assembly for a bicycle frame is provided comprising an upper portion integrally formed with the bicycle frame, the upper portion provided with a semi-circular interior surface receiving a crank shaft assembly and a lower portion(s) detachably connectable to the upper portion, the lower portion(s) provided with a semi-circular interior surface receiving the crank shaft assembly such that when the lower portion(s) is coupled to the upper portion the crank shaft assembly is secured therebetween. The assembly is provided such that the lower portion(s) has at least two lower mounting elements positioned on opposing sides of the lower portion(s) and the upper portion has at least two upper mounting elements complementary to the at least two lower mounting elements. The assembly further comprises at least two mounting devices positioned within the at least two lower and upper mounting elements, the at least two mounting devices passing through the at least two lower mounting elements into the at least two upper mounting elements to secure the lower portion(s) to the upper portion and providing a controlled bearing bore. The assembly is further provided such that the lower portion(s) is completely detachable from the upper portion.

In another advantageous embodiment, a method for maintaining a crank shaft assembly for a bicycle frame in a bottom bracket is provided comprising the steps of forming an upper portion integrally with the bicycle frame, the upper portion having a semi-circular interior surface and forming an lower portion(s) detachably connectable to the upper portion, the lower portion(s) having a semi-circular interior surface. The method further comprises the steps of positioning a crank shaft assembly between the upper and lower portion(s) and positioning at least two lower mounting elements on opposing sides of the lower portion(s). The method still further comprises the steps of positioning at least two upper mounting elements on opposing sides of the upper portion that are complementary to the at least two lower mounting elements and inserting at least two mounting devices into the at least two upper and lower mounting elements securing the lower portion(s) to the upper portion to provide a controlled bearing bore. The method is provided such that the lower portion(s) is completely detachable from the upper portion.

Other objects of the invention and its particular features and advantages will become more apparent from consideration of the following drawings and accompanying detailed description.

DETAILED DESCRIPTION OF THE INVENTION

Figure 1:
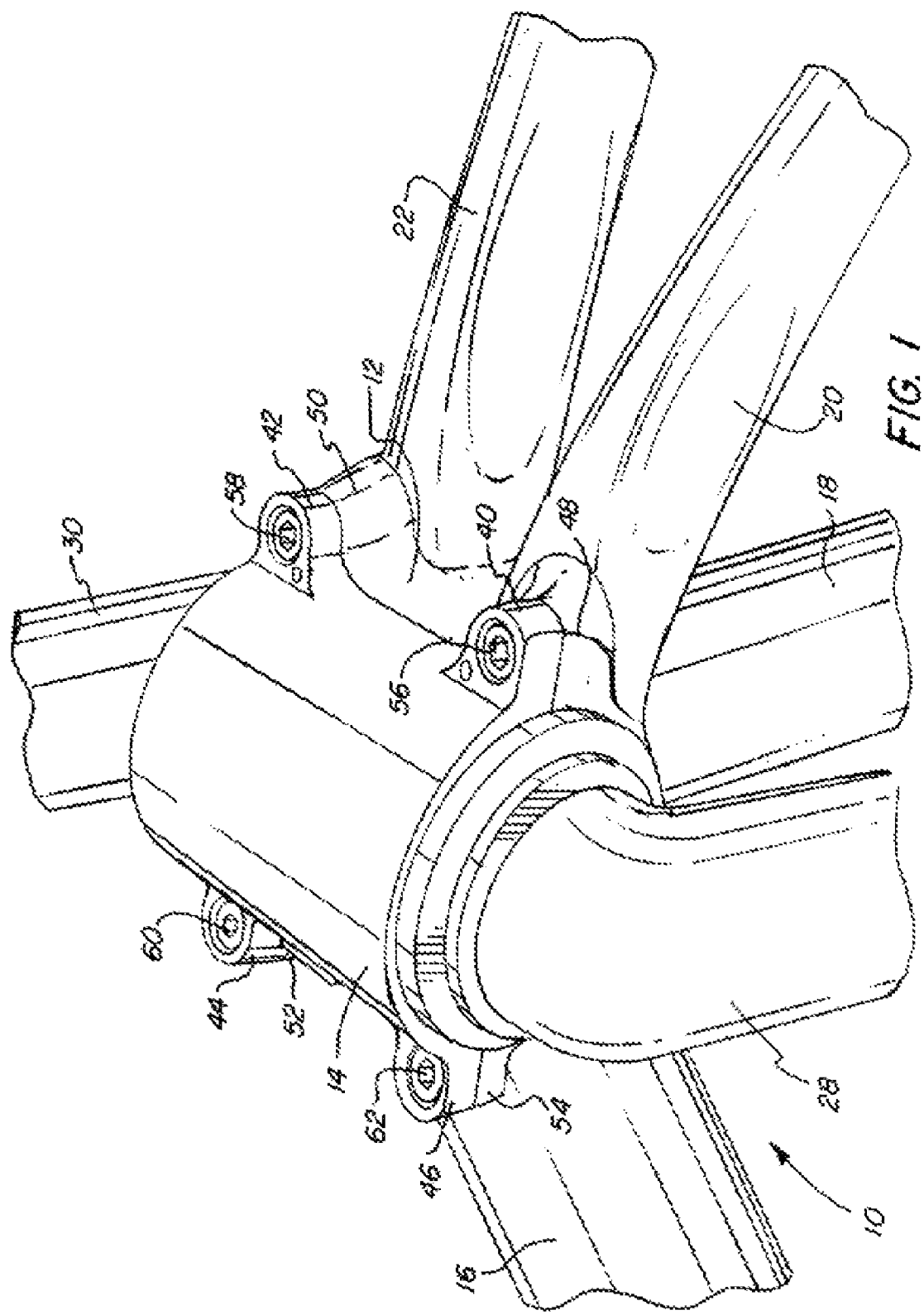
FIG. 1 is an illustration of an advantageous embodiment of an assembled bottom bracket assembly.

Referring now to the drawings, wherein like reference numerals designate corresponding structure throughout the views.

FIG. 1 is an illustration of the split bottom bracket assembly 10 according to one advantageous embodiment of the present invention. Split bottom bracket assembly 10 is shown assembled and comprises an upper portion 12 and lower portion 14. Upper portion 12 is formed integrally with the bicycle frame including tubes 16, 18, 20, 22. Upper portion 12 and lower portion 14 are coupled together and capture crank shaft assembly 24 (FIG. 2) therebetween. Crank shaft assembly 24 typically includes a crank shaft 26 along with pedal arms 28, 30 extending from crank shaft 26.

Figure 2:
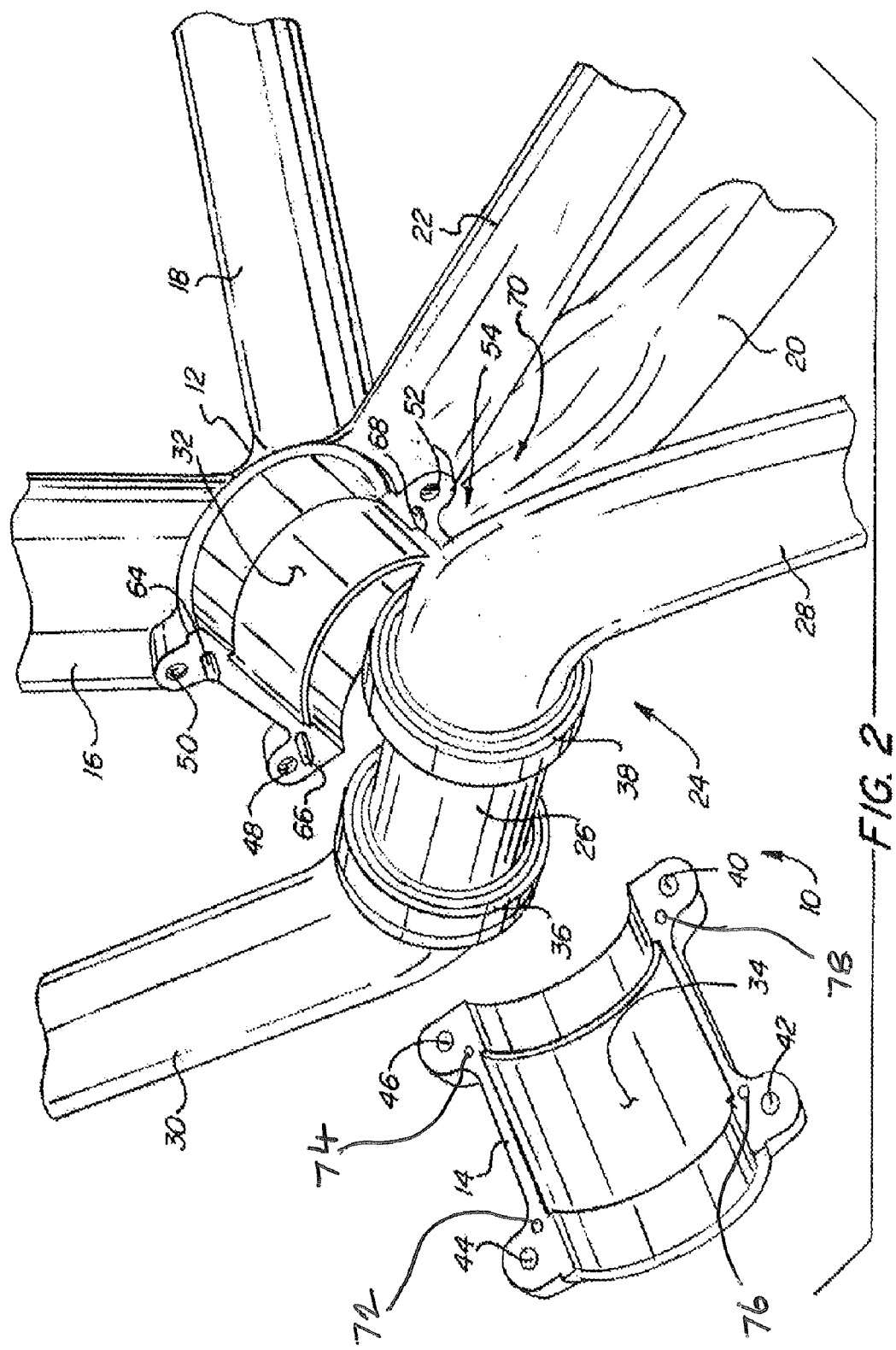
FIG. 2 is an illustration of the advantageous embodiment according to FIG. 1 when disassembled.
Figure 3:
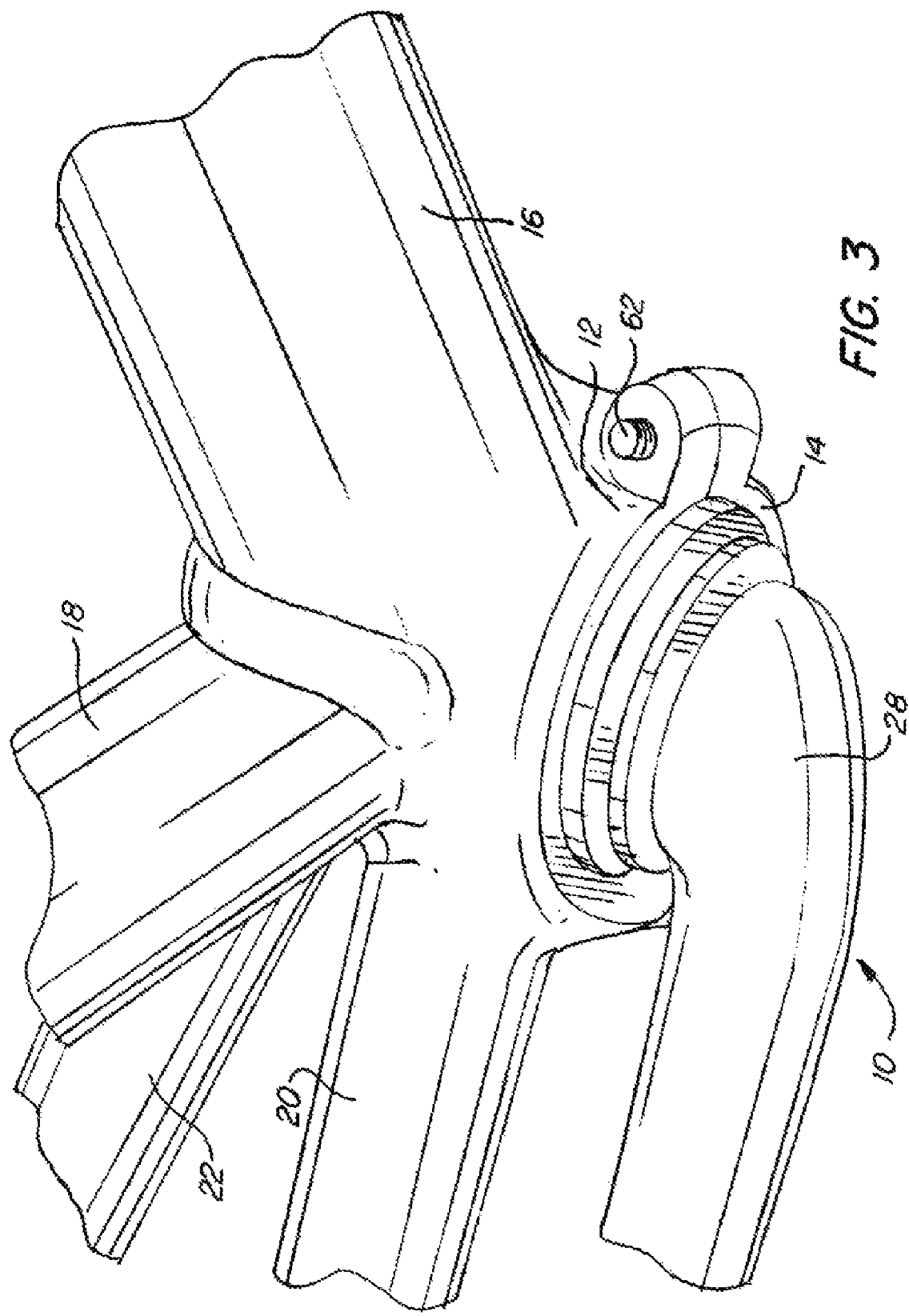
FIG. 3 is an illustration of the advantageous embodiment according to FIG. 1.

As seen in FIGS. 2 and 3, split bottom bracket assembly 10 is shown disassembled with crank shaft assembly 24 shown removed from split bottom bracket assembly 10. From this view it can be seen that upper portion 12 is provided having a semi-circular interior surface 32, while lower portion 14 is also provided with a semi-circular interior surface 34. Crank shaft assembly 24 is provided with bearings 36, 38 facilitating rotational movement of crank shaft 26.

Figure 4:
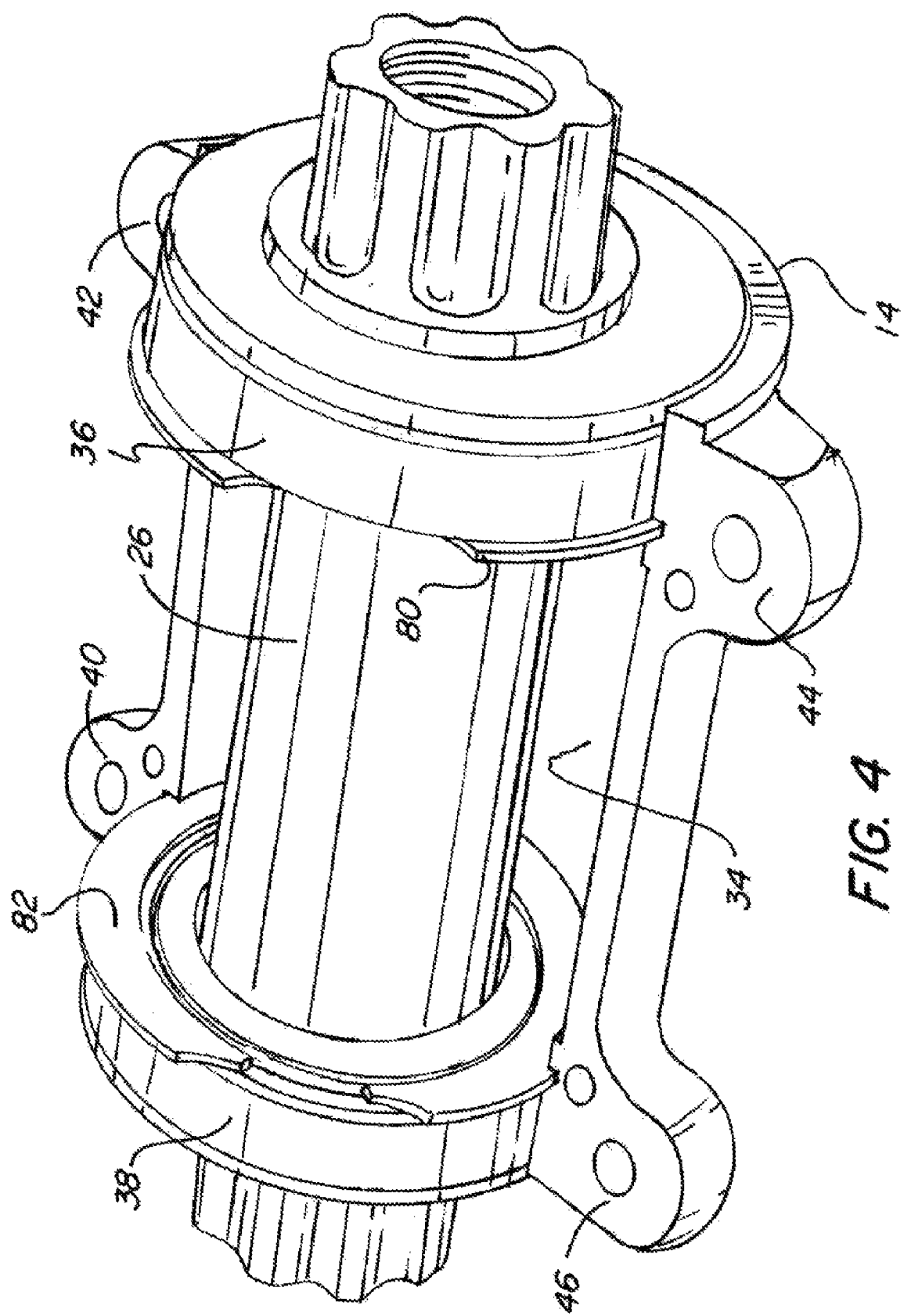
FIG. 4 is an illustration of the advantageous embodiment according to FIG. 3.
Figure 5:
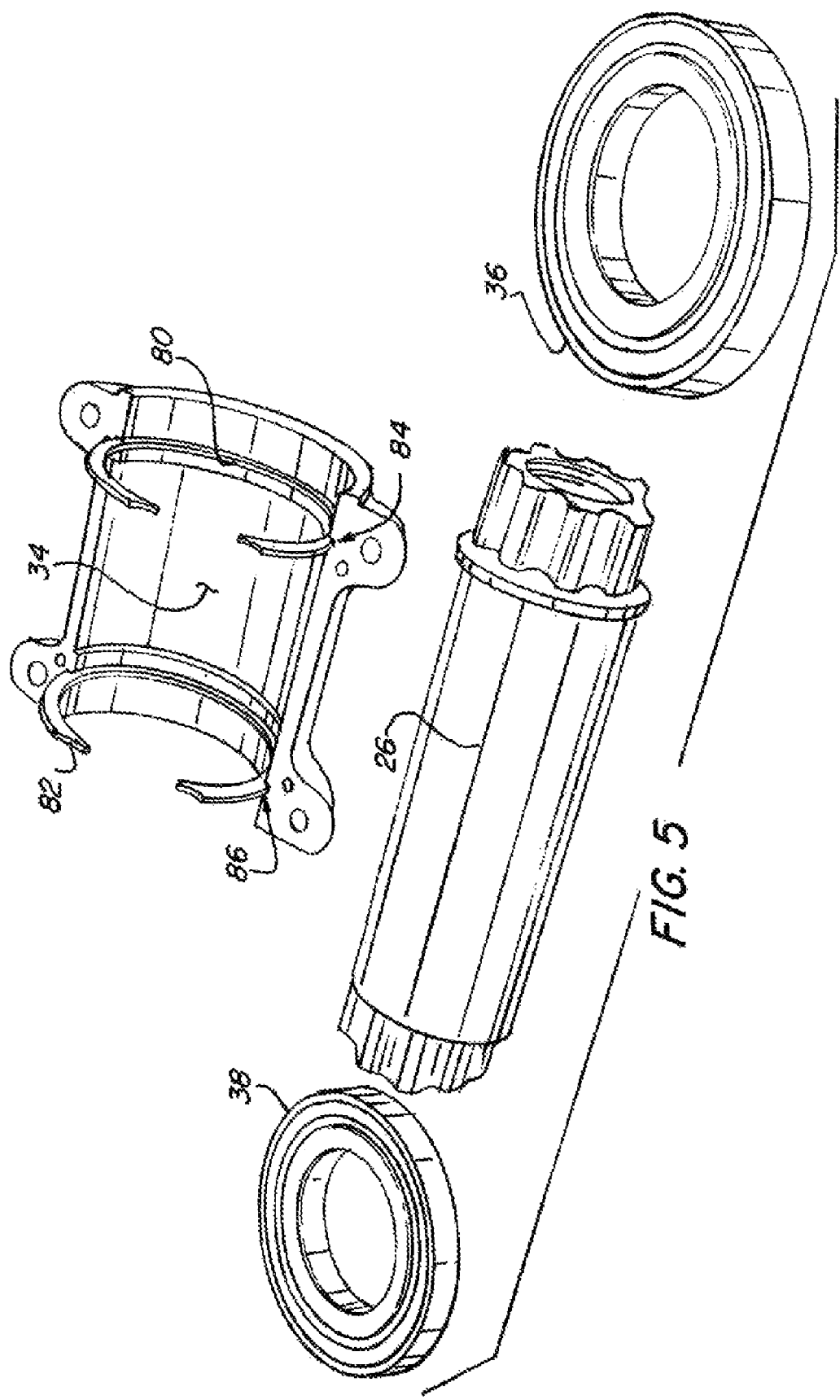
FIG. 5 is an illustration of the advantageous embodiment according to FIG. 4.

While the embodiment illustrated in FIGS. 1-3 are directed toward a crank shaft assembly 24 having a single unitary structure, it is contemplated that a multi-piece crank shaft assembly may effectively be used, for example, as illustrated in FIGS. 4 & 5.

Figure 8:
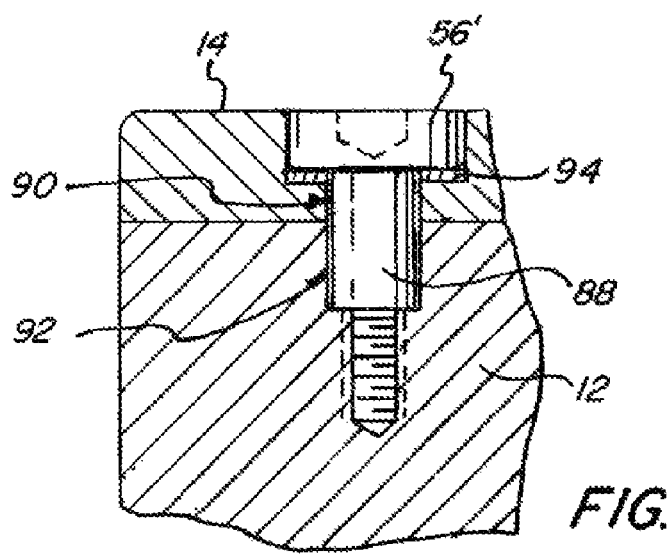
FIG. 8 is an illustration of a shoulder bolt that may be used with the embodiment according to FIG. 1.

Lower portion 14 is further provided with lower mounting elements 40, 42, 44, 46. In this particular embodiment, lower mounting elements 40, 42, 44, 46 are provided as tabs extending from the housing of lower portion 14 and include openings extending therethrough. Upper mounting elements 48, 50, 52, 54 are provided on upper portion 12. Accordingly, upon insertion of mounting devices 56, 58, 60, 62 (FIG. 1) into the various mounting elements, lower portion 14 is securely affixed to upper portion 12 with crank shaft assembly 24 held therebetween. In one advantageous embodiment, it is contemplated that mounting devices 56, 58, 60, 62 may comprise shoulder bolts to combine clamping and alignment functions (FIG. 8).

Also illustrated in FIG. 2 are alignment protrusions 64, 66, 68, 70 on upper portion 12 and complementary cavities 72, 74, 76, 78 positioned in lower portion 14. Alignment protrusions 64, 66, 68, 70 facilitate ease of alignment of the upper and lower mounting elements for assembly. While the alignment protrusions 64, 66, 68, 70 are illustrated mounted on upper portion 12, they may be positioned on lower portion 14 or may be removable, such that cavities are provided in both the upper and lower portions 12, 14 and the alignment protrusions 64, 66, 68, 70 are variously positioned in the cavities.

Referring now to FIGS. 4 and 5 another advantageous embodiment of the present invention is illustrated.

In this embodiment, a multi-piece crank shaft assembly 24 is used. The crank shaft assembly 24 includes a crank shaft 26 and pedal arms (not shown) that extend from the ends of crank shaft 26. Positioned on crank shaft 26 are bearings 36, 38 that facilitate rotational movement of crank shaft 26. Bearings 36, 38 are sized to fit in close tolerance to semi-circular interior surface 32 and semi-circular interior surface 34.

Also illustrated in FIGS. 4 and 5 are retaining rings 80, 82, which are provided to maintain bearings 36, 38 in position inside split bottom bracket assembly 10. As can be seen more clearly in FIG. 5, retaining rings 80, 82 are provided, in this advantageous embodiment, as a split ring having an opening provided therein. However, it is contemplated that retaining rings 80, 82 may be provided without openings. Also provided in semi-circular interior surface 32 and semi-circular interior surface 34 are channels 84, 86, which can be more clearly seen in FIG. 2. The channels 84, 86 are provided to hold retaining rings 80, 82 and prevent bearings 36, 38 from sliding laterally.

When assembled, the crank shaft 26 is positioned within bearings 36, 38. The retaining rings 80, 82 are positioned such that they abut the inside shoulders of bearings 36, 38 as seen in FIG. 4. In this manner, the entire assembly may be affixed to upper portion 12 and secured thereto. The user may then attach pedal arms as desired.

Alternatively, it should be noted that rather than retaining rings, semi-circular interior surface 32 and semi-circular interior surface 34 may be provided with shoulders to abut bearings 36, 38. For example, semi-circular interior surface 32 and semi-circular interior surface 34 may be provided as raised surfaces such that when bearings 36, 38 are positioned in the assembly, the bearings 36, 38 come in contact with the shoulder formed due to the semi-circular interior surfaces 32, 34 being raised.

In a preferred embodiment, the assembly is provided formed from a relatively light-weight metal or alloy providing high-strength characteristics while minimizing the weight of the device. In an alternative embodiment, the assembly or virtually any portion thereof may be provided formed from a composite material.

Figure 6:
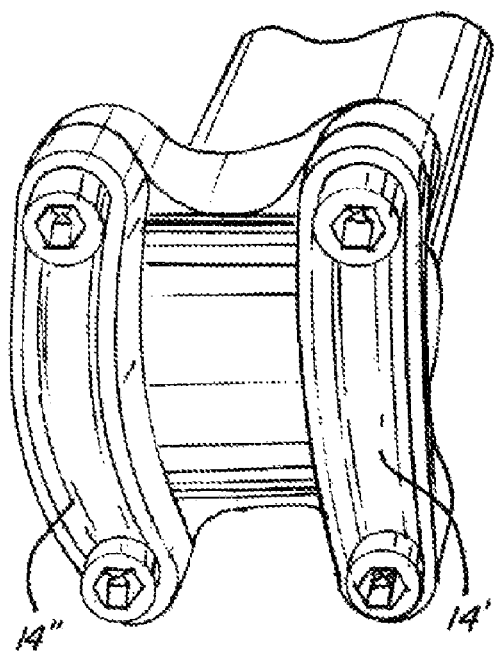
FIG. 6 is an illustration of the advantageous embodiment according to FIG. 1.
Figure 7:
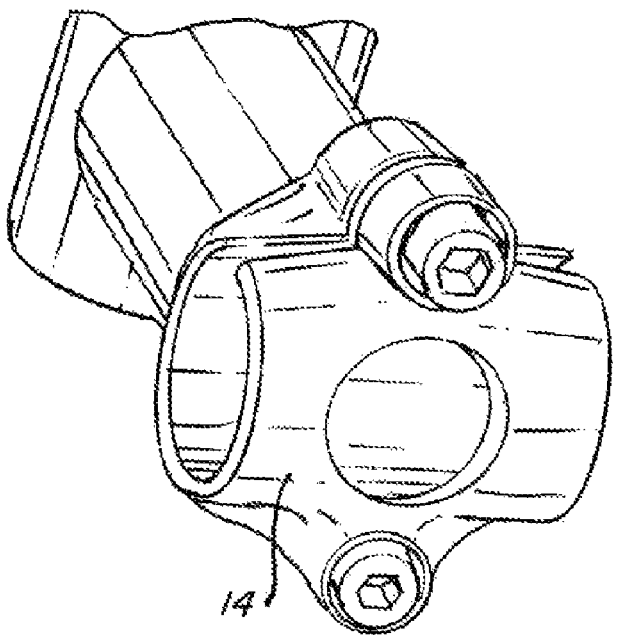
FIG. 7 is an illustration of the advantageous embodiment according to FIG. 1.

FIG. 6 is an alternative embodiment of the present invention where the lower portion (14) is shown as two separate pieces 14', 14". It can be seen that this embodiment reduces the weight of the entire assembly. In still another embodiment, FIG. 7 illustrates another configuration of the bracket assembly. Here, the lower portion 14 is provided as a single structure, however, the overall weight of the device is reduced as an opening is provided in the lower portion 14. It can also be seen that, in this embodiment, only two mounting elements are provided still further reducing the overall weight of the assembly.

FIG. 8 depicts upper portion 12 and lower portion 14 coupled together via a shoulder bolt 56'. In this embodiment, shoulder bolt 56' is provided to help align upper portion 12 and lower portion 14. For example, should bolt 56' is provided with a relatively smooth upper portion 88 that interacts with shoulder 90 of lower portion 14 and shoulder 92 of upper portion 12. As can be seen in FIG. 8, shoulder 90 is aligned with shoulder 92 when shoulder bolt 56' is positioned therein. Also illustrated in FIG. 8 is washer 94, which may be provided to, for instance, maintain a bias on shoulder bolt 56'.

Although the invention has been described with reference to a particular arrangement of parts, features and the like, these are not intended to exhaust all possible arrangements or features, and indeed many other modifications and variations will be ascertainable to those of skill in the art.

What is claimed is:

1. A bottom bracket assembly for a bicycle frame comprising:

an upper portion integrally formed with the bicycle frame, said upper portion provided with a semi-circular interior surface receiving a crank shaft assembly, said crank shaft assembly comprising a crank shaft having a first circular bearing coupled to one end of said crank shaft and a second circular bearing coupled to an opposing end of said crank shaft, said semi-circular interior surface of said upper portion defining an upper bearing preload surface;

a lower portion detachably connectable to said upper portion, said lower portion provided with a semi-circular interior surface receiving the crank shaft assembly such that when said lower portion is coupled to said upper portion the crank shaft assembly is secured therebetween, said semi-circular interior surface of said lower portion defining a lower bearing preload surface;

said lower portion having at least two lower mounting elements positioned on opposing sides of said lower portion and said upper portion having at least two upper mounting elements complementary to the at least two lower mounting elements;

at least two mounting devices positioned within said at least two lower and upper mounting elements, said at least two mounting devices passing through said at least two lower mounting elements into said at least two upper mounting elements to secure said lower portion to said upper portion such that said upper bearing preload surface and said lower bearing preload surface provide a controlled bearing preload surface interacting with said first circular bearing and said second circular bearing, said controlled bearing preload surface being obtained by simultaneously machining said semi-circular interior surface of said upper portion and said semi-circular interior surface of said lower portion while said upper portion and said lower portion are clamped together, resulting in a consistent bearing preload on said first circular bearing and said second circular bearing when said upper and lower portions are disassembled and reassembled;

an alignment protrusion and a cavity for interacting with said alignment protrusion such that when said lower portion is fitted against said upper portion, said alignment protrusion engages with said cavity to align said at least two lower and upper mounting elements;

said lower portion being completely detachable from said upper portion.

2. The bottom bracket assembly accordingly to claim 1 wherein said at least two lower mounting elements positioned on said lower portion comprise four lower mounting elements, positioned as pairs of elements on opposing sides of said lower portion and said upper portion has four upper mounting elements complementary to said four lower mounting elements.

3. The bottom bracket assembly accordingly to claim 1 wherein said at least two lower mounting elements comprise mounting tabs with holes extending therethrough and receiving said at least two mounting devices.

4. The bottom bracket assembly accordingly to claim 1 wherein said alignment protrusion is positioned on said upper portion and said cavity is positioned on said lower portion.

5. The bottom bracket assembly accordingly to claim 1 further comprising a retaining ring positioned along the interior surfaces of said upper and lower portions, said retaining ring maintaining the crank shaft of said crank shaft assembly within said bottom bracket assembly.

6. The bottom bracket assembly accordingly to claim 1 wherein at least one of said upper or lower portions includes a shoulder against which said first and second circular bearings coupled to said crank shaft interact to maintain said crank shaft assembly in place relative to said bottom bracket assembly.

7. The bottom bracket assembly accordingly to claim 1 wherein said crank shaft assembly comprises the crank shaft and two crank arms formed as a single unitary structure.

8. The bottom bracket assembly accordingly to claim 1 wherein said lower portion comprises at least two pieces, each piece having at least two lower mounting elements and said upper portion having at least four upper mounting elements complementary to said lower mounting elements, wherein said lower portions are completely detachable from said upper portion.

9. The bottom bracket assembly accordingly to claim 1 wherein said lower portion is provided with an opening therein extending through said lower portion.

10. The bottom bracket assembly accordingly to claim 1 wherein said lower portion is detachably connected to only said upper portion.

11. A bottom bracket assembly for a bicycle frame comprising:
   an upper portion integrally formed with the bicycle frame, said upper portion provided with a semi-circular interior surface receiving a crank shaft assembly;
   a lower portion detachably upper portion, said lower portion provided with a semi-circular interior surface receiving the crank shaft assembly such that when said lower portion is coupled to said upper portion the crank shaft assembly is secured therebetween;
   said lower portion having at least two lower mounting elements positioned on opposing sides of said lower portion and said upper portion having at least two upper mounting elements complementary to the at least two lower mounting elements;
   at least two mounting devices positioned within said at least two lower and upper mounting elements, said at least two mounting devices passing through said at least two lower mounting elements into said at least two upper mounting elements to secure said lower portion to said upper portion;
   a retaining ring positioned along the interior surfaces of said upper and lower portions, said retaining ring maintaining a crank shaft of said crank shaft assembly within said bottom bracket assembly;
   a channel formed in said upper and lower interior surfaces capturing said retaining ring;
   said lower portion being completely detachable from said upper portion.

12. The bottom bracket assembly accordingly to claim 11 wherein said retaining ring comprises at least two retaining rings positioned on opposing sides of said bottom bracket assembly.

13. The bottom bracket assembly accordingly to claim 12 further comprising two channels formed in said upper and lower interior surfaces capturing said two retaining rings respectively.

* * * * *